US008194883B2

(12) United States Patent
Choi

(10) Patent No.: US 8,194,883 B2
(45) Date of Patent: Jun. 5, 2012

(54) APPARATUS AND METHOD FOR DESIGNING SOUND COMPENSATION FILTER IN PORTABLE TERMINAL

(75) Inventor: Nak-Jin Choi, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 691 days.

(21) Appl. No.: 12/342,563

(22) Filed: Dec. 23, 2008

(65) Prior Publication Data

US 2009/0169032 A1 Jul. 2, 2009

(30) Foreign Application Priority Data

Dec. 28, 2007 (KR) ........................ 10-2007-0139689

(51) Int. Cl.
*H04B 15/00* (2006.01)

(52) U.S. Cl. ..................... 381/94.2; 381/94.4; 381/94.5; 381/94.8

(58) Field of Classification Search ................. 381/94.2, 381/94.4, 94.5, 94.8
See application file for complete search history.

(56) References Cited

U.S. PATENT DOCUMENTS 5,790,538 A * 8/1998 Sugar ............................ 370/352
5,940,479 A * 8/1999 Guy et al. .................. 379/93.01
2003/0171919 A1* 9/2003 Kim et al. ..................... 704/229

* cited by examiner

*Primary Examiner* — Wai Sing Louie
(74) *Attorney, Agent, or Firm* — Jefferson IP Law, LLP

(57) ABSTRACT

A method and an apparatus for designing a sound compensation filter of a portable terminal are provided. The method includes synchronizing a signal input through a microphone of the system and a test signal, estimating a loss interval of the synchronized signal, compensating for a frame signal delayed by a signal loss in a time axis when the signal loss of the estimated loss interval is greater than a threshold and restoring the loss interval of the signal.

17 Claims, 8 Drawing Sheets

(A) WITHOUT SIGNAL LOSS (B) WITH SIGNAL LOSS (A) WITHOUT SIGNAL LOSS (B) WITH SIGNAL LOSS (A) WITHOUT SIGNAL LOSS (B) WITH SIGNAL LOSS

APPARATUS AND METHOD FOR DESIGNING SOUND COMPENSATION FILTER IN PORTABLE TERMINAL

PRIORITY

This application claims the benefit under 35 U.S.C. §119 (a) to a Korean patent application filed in the Korean Intellectual Property Office on Dec. 28, 2007 and assigned Serial No. 10-2007-0139689, the entire disclosure of which is hereby incorporated by reference.

BACKGROUND OF THE INVENTION

1. Field of the Invention

The present invention relates to a method and apparatus for designing a sound compensation filter of a portable terminal. More particularly, the present invention relates to a method and an apparatus for designing a sound compensation filter of a portable terminal by recovering loss of a sound signal.

2. Description of the Related Art

Recently, advances in the electronics and communication industries have lead to the wide spread use of portable terminals. To meet user's evolving demands, portable terminals are advancing from the simple function of mobile communication to provide various additional functions. Also, portable terminals are being made smaller and lighter.

When a portable terminal is made smaller and lighter, a resonance space of the portable terminal becomes quite narrow. Accordingly, a small-scale loudspeaker is provided. Hence, sound characteristics of the portable terminal exhibit a frequency response having a variation range of about ±20 dB within an operating frequency. Such variation causes the sound characteristics of the portable terminal to be worse than a general audio system. However, the poor sound characteristics can be greatly improved by embedding a compensation filter in the portable terminal.

FIG. 1 is a block diagram of a sound compensation filter designed for a conventional portable terminal.

Referring to FIG. 1, a test signal generated at a computer is converted through a D/A codec 101 of a computer measurement device, amplified through a power amplifier 103, and applied to the portable terminal. The signal reproduced through a speaker 105 of the portable terminal is input to a microphone 107 of the measurement device and stored in the computer via a microphone amplifier 109 and an A/D codec 111. The computer extracts an impulse response signal 115 from the stored signal using a reverse test signal and calculates a frequency response 117 using the extracted impulse response signal. Using the calculated frequency response signal, a compensation filter 119 is designed.

More specifically, the characteristics of the frequency response vary in range by about ±20 dB within the operating frequency. That is, the frequency response includes a plurality of peaks and dips, which degrade the sound quality (or the sound). To compensate for the peaks and the dips, the computer drops the peaks and raises the dips. Thus, the compensation filter 119 is designed by obtaining the inverse frequency response.

The designed compensation filter 119 is stored in a memory of the portable terminal and applied in real time every time a user replays music using the portable terminal. In a conventional portable terminal of FIG. 2, after passing through a decoder (not shown), the sound source is compensated in real time at the compensation filter 220, converted to an analog signal through a D/A codec 202, amplified through a power amplifier 204, and then output through a speaker 206.

As discussed above and illustrated in FIGS. 1 and 2, it is primarily the computer that implements the filter to compensate for the sound. Accordingly, if the computer suffers from a resource problem, a signal loss may result. Also, a signal loss may result from a data drop in communications between devices. Since the signal loss is very small in comparison with the total waveform, it is difficult to determine the signal loss merely using the recording waveform of FIG. 3. However, the presence or absence of the signal loss can be determined by thoroughly examining the detailed waveform as shown in FIG. 4. Unfortunately, this method is disadvantageous because it takes quite a long time. Yet the determination of a signal loss is important because, even with a small signal loss, the calculated frequency response characteristics vary significantly as shown in FIG. 5 if a signal loss has occurred. Thus, it is difficult to compensate for a waveform that includes a signal loss when designing a compensation filter.

SUMMARY OF THE INVENTION

An aspect of the present invention is to address at least the above mentioned problems and/or disadvantages and to provide at least the advantages described below. Accordingly, an aspect of the present invention is to provide a method and an apparatus for designing a sound compensation filter of a portable terminal.

Another aspect of the present invention is to provide a method and an apparatus for compensating for a signal delay caused by a loss of a sound signal.

Yet another aspect of the present invention is to provide a method and an apparatus for designing a sound compensation filter of a portable terminal by restoring a loss of a sound signal.

According to an aspect of the present invention, a method for restoring a compromised test signal in a sound compensation filter design system is provided. The method includes synchronizing a signal input through a microphone of the system and a test signal, estimating a loss interval of the synchronized signal, compensating for a frame signal delayed by a signal loss in a time axis when the signal loss of the estimated loss interval is greater than a threshold and restoring the loss interval of the signal.

According to another aspect of the present invention, an apparatus for restoring a compromised test signal in a sound compensation filter design system is provided. The apparatus includes a signal synchronizer for synchronizing a signal input through a microphone of the system and a test signal, a loss interval estimator for estimating a loss interval of the signal input from the signal synchronizer, a signal delay compensator for compensating for a frame signal delayed by a signal loss in a time axis when the signal loss of the loss interval estimated at the loss interval estimator is greater than a threshold and a loss signal restorer for restoring the loss interval of the signal input from the signal delay compensator.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Exemplary embodiments of the present invention provide a method and an apparatus for designing a sound compensation filter of a portable terminal by compensating for a signal delay caused by a loss of a sound signal and restoring the loss of the sound signal.

Figure 1:
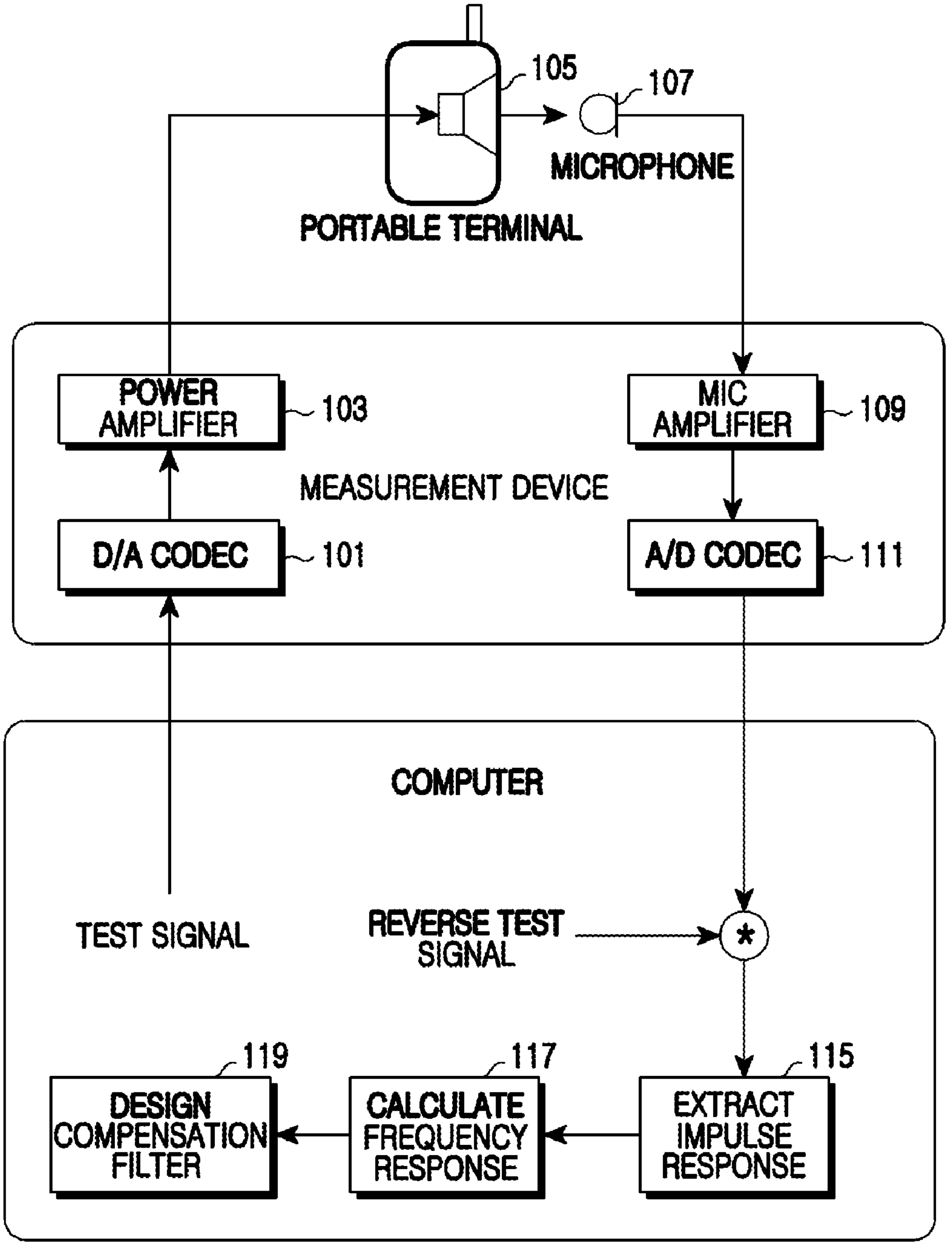
FIG.1 (CONVENTIONAL ART)
FIG. 1 illustrates a sound compensation filter designed for a conventional portable terminal.
Figure 2:
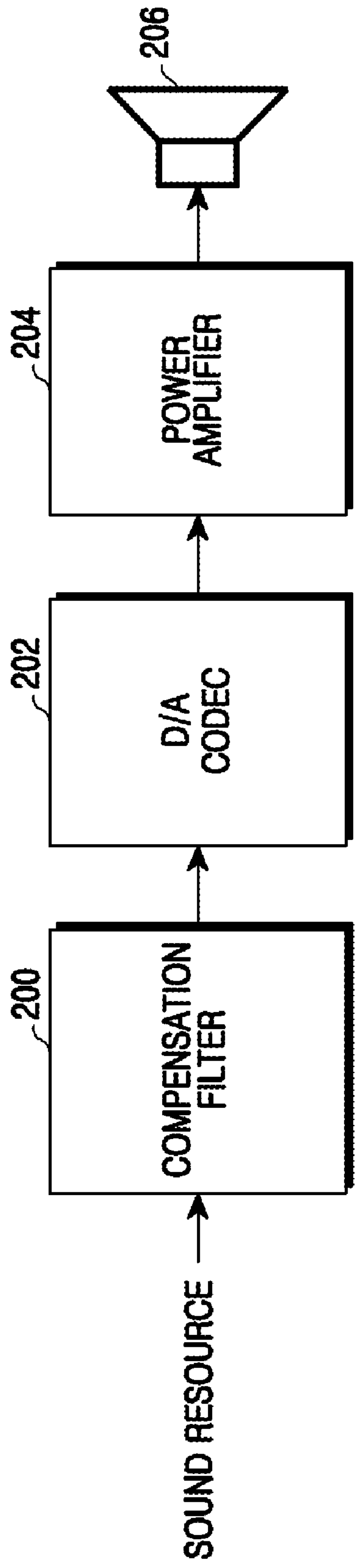
FIG.2 (CONVENTIONAL ART)
FIG. 2 illustrates a structure for outputting sound through the compensation filter in the conventional portable terminal.
Figure 3:
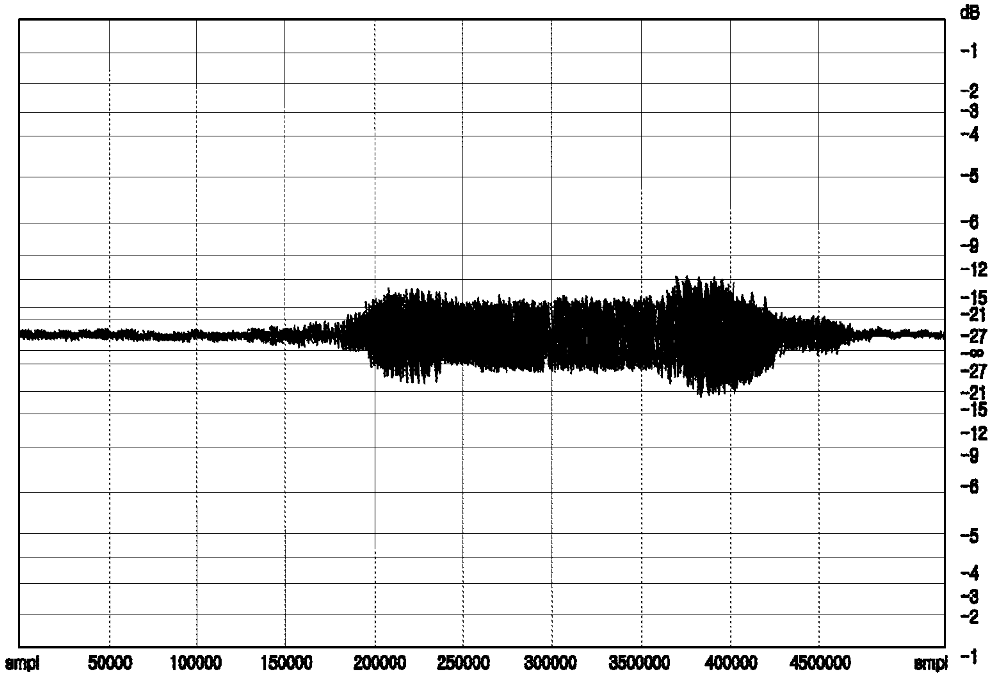
FIG.3 (CONVENTIONAL ART)
FIG. 3 illustrates a waveform of a test signal recorded in the absence and the presence of a signal loss.
Figure 3:
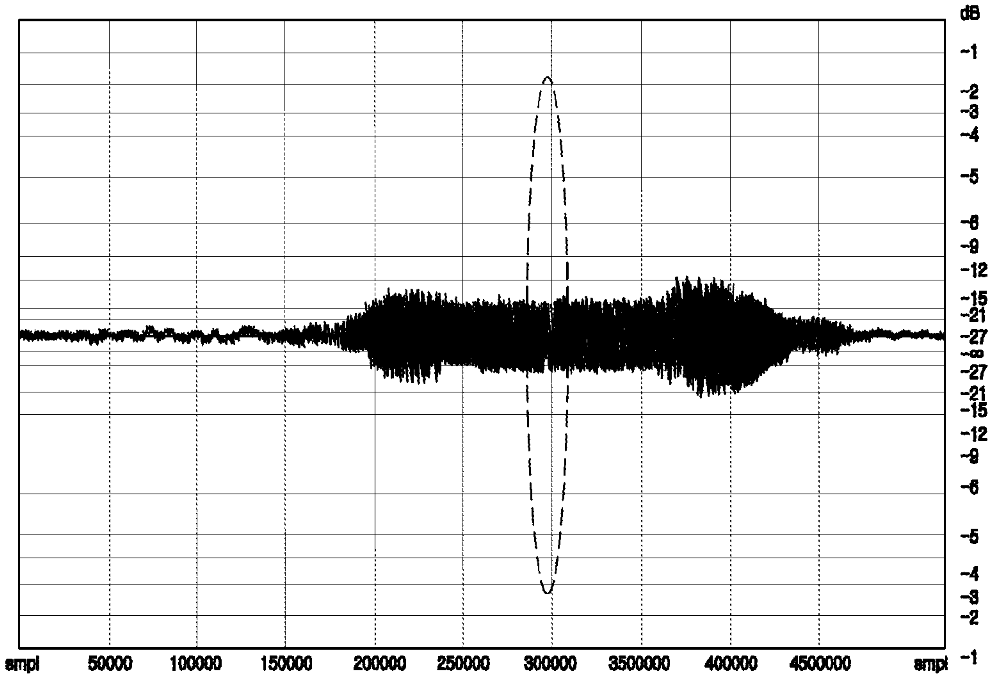
FIG.3 (CONVENTIONAL ART)
Figure 4:
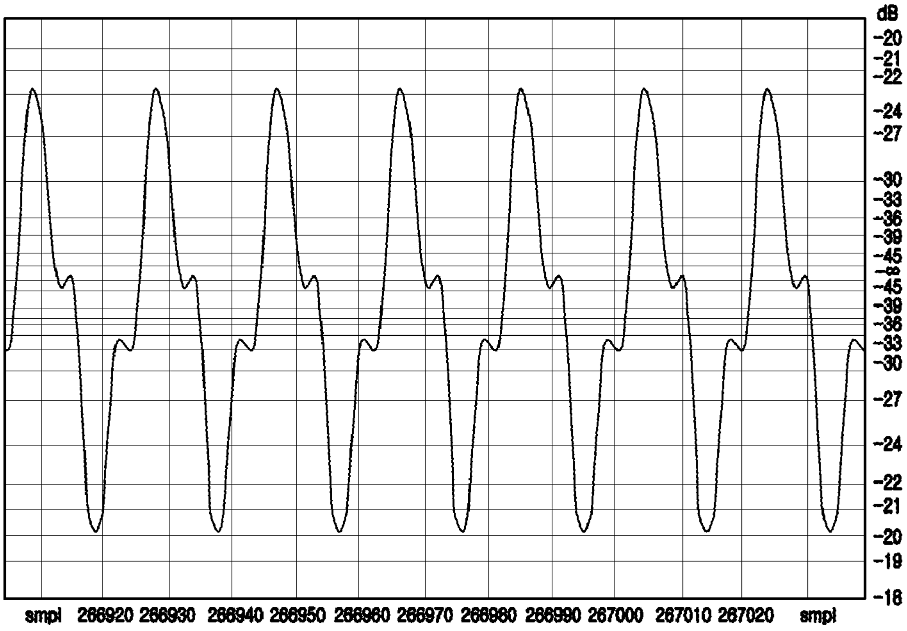
FIG.4 (CONVENTIONAL ART)
FIG. 4 illustrates the detailed waveform of a test signal recorded in the absence and the presence of the signal loss in a time domain.
Figure 4:
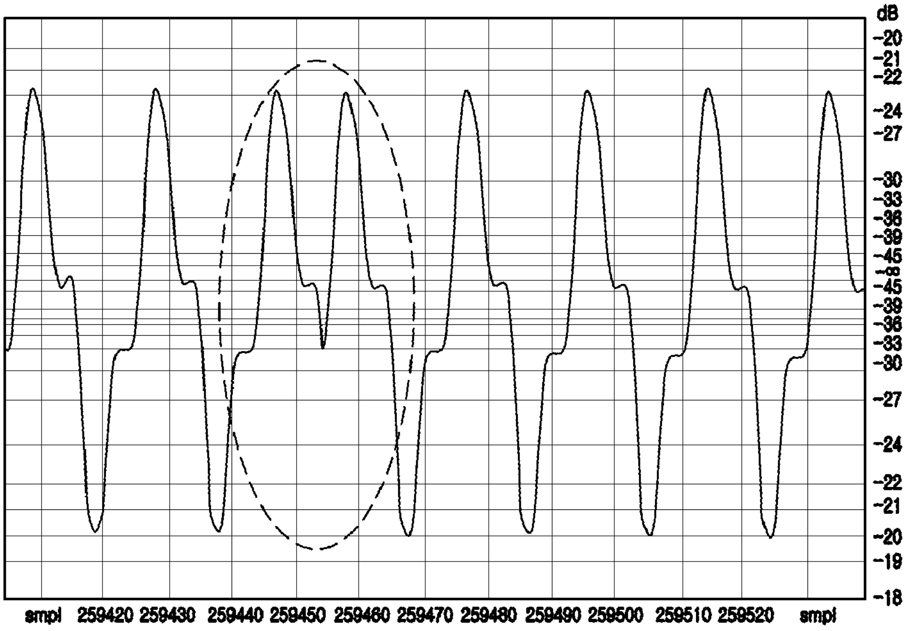
FIG.4 (CONVENTIONAL ART)
Figure 5:
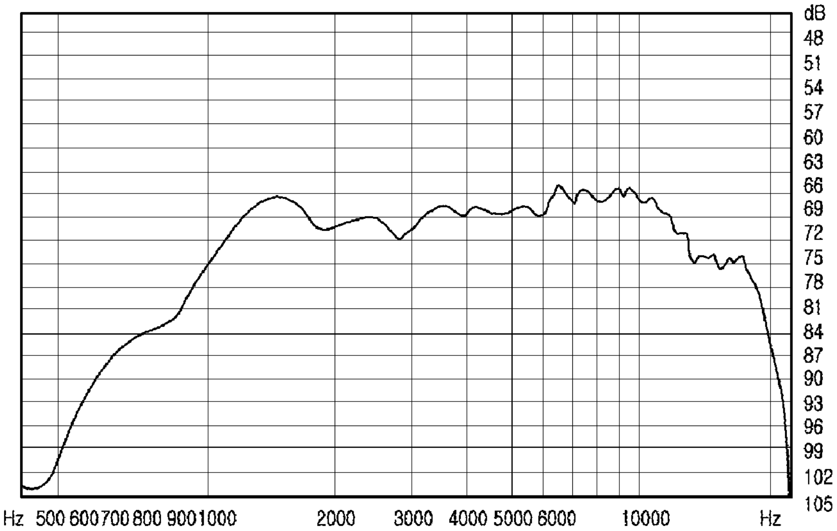
FIG.5 (CONVENTIONAL ART)
FIG. 5 illustrates frequency response characteristics in the absence and the presence of the signal loss.
Figure 5:
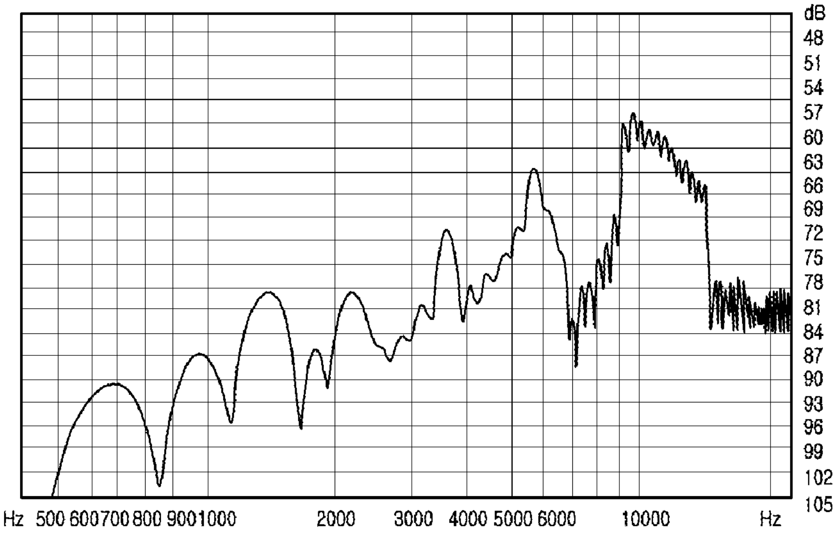
FIG.5 (CONVENTIONAL ART)
Figure 6:
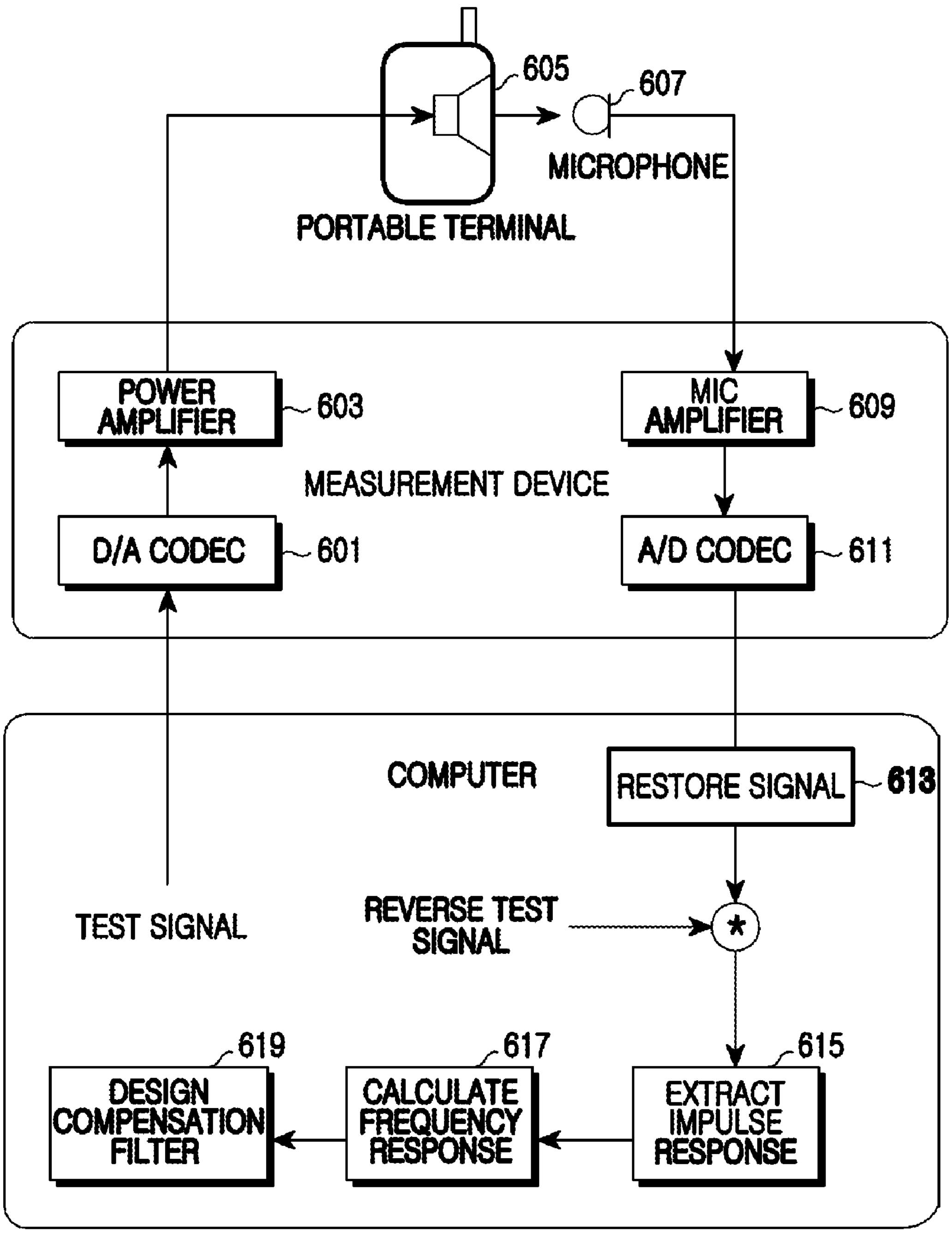
FIG. 6 illustrates a sound compensation filter design system of a portable terminal according to an exemplary embodiment of the present invention.

FIG. 6 illustrates a sound compensation filter design system of a portable terminal according to an exemplary embodiment of the present invention.

Referring to FIG. 6, a test signal generated at a computer is converted to an analog signal through a D/A codec 601 of a computer measurement device, amplified through a power amplifier 603, and applied to the portable terminal. The signal reproduced through a speaker 605 of the portable terminal is input to a microphone 607 of the measurement device and stored in the computer via a microphone amplifier 609 and an A/D codec 611.

The computer restores the signal 613, which will be described in further detail with reference to FIGS. 7 and 8. The computer extracts an impulse response signal 615 from the restored signal using a reverse test signal, extracts an inverse frequency response by calculating a frequency response 617 using the extracted response signal, and designs the compensation filter 619 based on the extracted characteristics.

The designed compensation filter is stored in a memory of the portable terminal and applied in real time every time a user replays music using the portable terminal.

The restoration of the test signal 613 is described in more detail with reference to FIG. 7. In the following description, the test signal is restored in the computer. However, the test signal may also be restored in the portable terminal or other electronic devices in various exemplary implementations. That is, the sound reproduced through the speaker of the portable terminal can be measured and compensated by any other devices including a microphone. The sound may be measured and compensated by the portable terminal which reproduces the sound or by another portable terminal.

Figure 7:
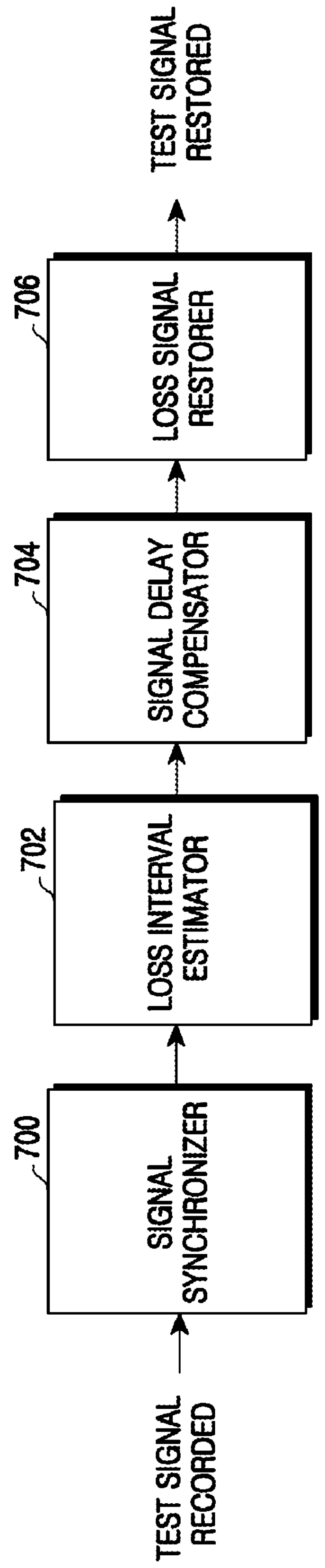
FIG. 7 illustrates an apparatus for restoring a sound signal in designing a sound compensation filter of a portable terminal according to an exemplary embodiment of the present invention.

FIG. 7 is a block diagram of an apparatus for restoring a sound signal in designing a sound compensation filter of a portable terminal according to an exemplary embodiment of the present invention.

Referring to FIG. 7, when a test signal is provided to and reproduced by the portable terminal and recorded by the computer, a signal synchronizer 700 synchronizes the recorded signal with the test signal and outputs the synchronized signal to a loss interval estimator 702.

The loss interval estimator 702 segments and divides the received signal into frames and calculates a time average of all the frames in the segment. The loss interval estimator 702 conducts a Fast Fourier Transform on the signal divided into the frames and the time average of the frames and estimates a signal loss interval in every segment and in every frame. The loss interval estimator 702 outputs the signal segmented and divided into the frames to a signal delay compensator 704.

The signal delay compensator 704 compensates for a delay of the received signal and outputs the compensated signal to a loss signal restorer 706. Herein, when the segment includes a frame having a signal loss, a delay in the signal of the frame not including the signal loss is inevitable. The signal delay compensator 704 compensates for the signal delay of the frame not including the signal loss.

The loss signal restorer 706 restores the signal loss interval estimated at the loss interval estimator 702 from the input signal and outputs the restored test signal. Herein, the signal restoration can be carried out using a least squares method having a criterion. The restored test signal is used to design a sound compensation filter to be applied to the portable terminal. Also, the restored test signal can be reused as the test signal.

Figure 8:
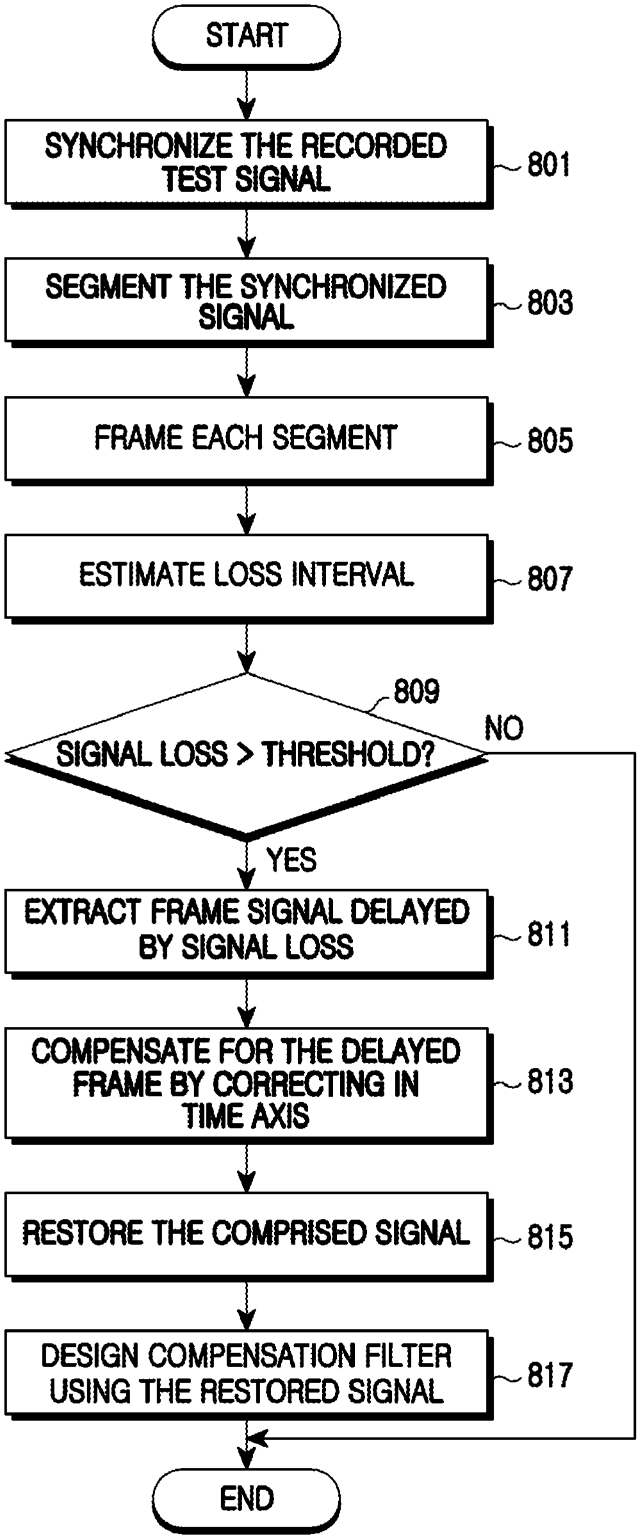
FIG. 8 illustrates a method for restoring a sound signal in designing a sound compensation filter of a portable terminal according to an exemplary embodiment of the present invention.

FIG. 8 is a flowchart outlining a method for restoring a sound signal in designing a sound compensation filter of a portable terminal according to an exemplary embodiment of the present invention.

Referring to FIG. 8, when the test signal is reproduced by the portable terminal and recorded by the computer, the sound compensation filter design system synchronizes the recorded signal with the test signal in step 801 and segments the synchronized signal in step 803.

The sound compensation filter design system frames the segmented signal in step 805 and estimates the loss interval in step 807. To estimate the loss interval, the time average of the frames in the segments is calculated, a Fast Fourier Transform is applied to the framed signal and the time average of the frame, and the signal loss interval is estimated in every segment and in every frame.

In step 809, the sound compensation filter design system determines whether the signal loss is greater than a threshold. Herein, the threshold may be determined through experiments. When the signal loss is less than the threshold, the sound compensation filter design system finishes this process.

Alternatively, when the signal loss is greater than the threshold, the sound compensation filter design system extracts the frame signal delayed by the signal loss in step 811 and compensates for the delayed frame in the time axis in step 813. The signal delay is compensated as follows.

A signal model for $y_s^i$ is generally expressed as Equation (1).

$$y_s^i[n, m] = \sum_{l=1}^{N_i} a_i^l \cos\left(2\pi \frac{f_i^l}{f_s} n + \phi_i^l\right) + N[n] \quad (1)$$

In Equation (1), $y_s^i[n,m]$ denotes a signal synchronized with the recorded signal, segmented in sequence, and divided into frames, $a_i^l$ denotes a maximum harmonics order of the i-th segment, $f_s$ denotes a sampling frequency, and $f_i^l$ denotes the l-th harmonic frequency. $\phi_i^l$ denotes a phase of the l-th segment, N[n] denotes noise, n denotes a time index, m denotes a frame index, i denotes a segment index, l denotes the number of segments, and $N_i$ denotes the total number of harmonics.

The estimations of $a_i^l$, $f_i^l$ and $\phi_i^l$ may be obtained using the least squares method having the criterion based on Equation (2).

$$\left(\hat{a}_i^l, \hat{f}_i^l, \hat{\phi}_i^l\right) = \underset{a_i^l, f_i^l, \phi_i^l}{\operatorname{argmin}} \sum_{n=0}^{T_i-1} \left| \sum_{l=1}^{N_i} a_i^l \cos\left(2\pi \frac{f_i^l}{f_s} n + \phi_i^l\right) - y_s^i[n, m] \right|^2 \quad (2)$$

In Equation (2), $T_i$ denotes a frame length, which is an integer multiple of a fundamental frequency time period in the i-th segment.

The estimation of $y_s^i[n,m]$ is given by Equation (3).

$$\hat{y}_s^i[n, m] = \sum_{l=1}^{N_i} \hat{a}_i^l \cos\left(2\pi \frac{\hat{f}_i^l}{f_s} n + \hat{\phi}_i^l\right) \quad (3)$$

The $m_{delay}$-th frame including the signal delay has a signal model as expressed by Equation (4).

$$\hat{y}_s^i[n, m_{delay}] = \hat{y}_s^i[n - n_{delay}, m] = \sum_{l=1}^{N_i} \hat{a}_i^l \cos\left(2\pi \frac{\hat{f}_i^l}{f_s}(n - n_{delay}) + \hat{\phi}_i^l\right) \quad (4)$$

Equation (4) expresses the compensation of the signal delay.

The estimation of the reference frame $y_s^i[n,m]$ and the estimation of the frame $y_s^i[n,m_{delay}]$ including the signal delay pass through the Fast Fourier Transform based on Equation (5) and Equation (6) and produce the relation as given by Equation (7).

$$\hat{Y}_s^i[k, m_0] = \sum_{n=0}^{T_i-1} \hat{y}_s^i[n, m_0] e^{-j\frac{2\pi kn}{T_i}}, \; 0 \le k \le T_i - 1 \quad (5)$$

$$\hat{Y}_s^i[k, m_{delay}] = \sum_{n=0}^{T_i-1} \hat{y}_s^i[n, m_{delay}] e^{-j\frac{2\pi kn}{T_i}}, \; 0 \le k \le T_i - 1 \quad (6)$$

$$\hat{Y}_s^i[k, m_{delay}] = \hat{Y}_s^i[k, m_0] e^{-j\frac{2\pi k n_{delay}}{T_i}} \quad (7)$$

Accordingly, the signal delay $n_{delay}$ of the $m_{delay}$-th frame of the i-th segment can be expressed as Equation (8).

$$n_{delay} = j \frac{T_i}{2\pi k n_{delay}} \ln \frac{\hat{Y}_s^i[k, m_{delay}]}{\hat{Y}_s^i[k, m_0]} \quad (8)$$

The signal-delayed frame is compensated based on Equation (9).

$$y_{s,comp}^i[n, m_{delay}] = y_s^i[n + n_{delay}, m_{delay}] \quad (9)$$

In step 815, the sound compensation filter design system restores the compromised signal. The compromised signal is restored based on Equation (10) and Equation (11). The estimations of $a_i^l$, $f_i^l$ and $\phi_i^l$ are acquired using every frame, excluding the frame including the signal loss, in the i-th segment. For doing so, the least squares method having the criterion is used based on Equation (11).

$$y_s^i[n, m_L] = \sum_{l=1}^{N_i} \hat{a}_i^l \cos\left(2\pi \frac{\hat{f}_i^l}{f_s} n + \hat{\phi}_i^l\right) \quad (10)$$

$$\left(\hat{a}_i^l, \hat{f}_i^l, \hat{\phi}_i^l\right) = \underset{a_i^l, f_i^l, \phi_i^l}{\operatorname{argmin}} \sum_{\substack{m=0 \\ m \ne m_{loss}}}^{M-1} \sum_{n=0}^{T_i-1} \left| \sum_{l=1}^{N_i} a_i^l \cos\left(2\pi \frac{f_i^l}{f_s} n + \phi_i^l\right) - y_{s,comp}^i[n, m] \right|^2 \quad (11)$$

The sound compensation filter design system designs the compensation filter using the restored signal in step 817 and finishes this process.

As set forth above, as designing the sound compensation filter of the portable terminal, the signal delay caused by the loss of the test sound signal is compensated and the loss of the sound signal is restored. Therefore, the presence or the absence of the loss of the test signal of the portable terminal can be facilitated and the compromised test signal can be restored and reused.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for restoring a compromised test signal in a sound compensation filter design system, the method comprising:

synchronizing a signal input through a microphone of the system and a test signal;

estimating a loss interval of the synchronized signal;

compensating for a frame signal delayed by a signal loss in a time axis when the signal loss of the estimated loss interval is greater than a threshold; and restoring the loss interval of the signal.

2. The method of claim 1, wherein the estimating of the loss interval comprises:

segmenting and dividing the synchronized signal into frames;

calculating a time average of all the frames in the segment;

conducting a Fast Fourier Transform (FFT) on the signal divided into the frames and the time average of the frames; and estimating a signal loss interval in every segment and in every frame.

3. The method of claim 2, further comprising extracting the frame signal delayed by the signal loss from the segmented signal.

4. The method of claim 1, wherein the estimating of the loss interval comprises using a least squares method having a criterion based on the following equation:

$$(\hat{a}_i^l, \hat{f}_i^l, \hat{\phi}_i^l) = \underset{a_i^l, f_i^l, \phi_i^l}{\operatorname{argmin}} \sum_{n=0}^{T_i-1} \left| \sum_{l=1}^{N_i} a_i^l \cos\left(2\pi \frac{f_i^l}{f_s} n + \phi_i^l\right) - y_s^i[n, m] \right|^2$$

where $y_s^l[n,m]$ denotes a signal synchronized with a recorded test signal, segmented in sequence, and divided into frames, $a_i^l$ denotes a maximum harmonics order of an i-th segment, $f_s$ denotes a sampling frequency, $f_i^l$ denotes an l-th harmonic frequency, $\phi_i^l$ denotes a phase of the l-th segment, N[n] denotes noise, n denotes a time index, m denotes a frame index, i denotes a segment index, l denotes a number of segments, $T_i$ denotes a frame length, and $N_i$ denotes a total number of harmonics.

5. The method of claim 1, wherein the restoring of the loss interval of the signal comprises using a least squares method having a criterion based on the following equation:

$$(\hat{a}_i^l, \hat{f}_i^l, \hat{\phi}_i^l) = \underset{a_i^l, f_i^l, \phi_i^l}{\operatorname{argmin}} \sum_{\substack{m=0 \\ m \neq m_{loss}}}^{M-1} \sum_{n=0}^{T_i-1} \left| \sum_{l=1}^{N_i} a_i^l \cos\left(2\pi \frac{f_i^l}{f_s} n + \phi_i^l\right) - y_{s,comp}^i[n, m] \right|^2$$

where $y_{s,comp}^i[n,m]$ denotes a compensated signal, $a_i^l$ denotes a maximum harmonics order of an i-th segment, $f_s$ denotes a sampling frequency, $f_i^l$ denotes an l-th harmonic frequency, $\phi_i^l$ denotes a phase of the l-th segment, N[n] denotes noise, n denotes a time index, m denotes a frame index, i denotes a segment index, l denotes a number of segments, $T_i$ denotes a frame length, and $N_i$ denotes a total number of harmonics.

6. The method of claim 1, further comprising:

designing a compensation filter using the restored test signal.

7. The method of claim 1, wherein the threshold is determined on an experimental basis.

8. The method of claim 1, wherein the signal input through the microphone of the system is output from one of a speaker of at least one of the system and another device.

9. An apparatus for restoring a compromised test signal in a sound compensation filter design system, the apparatus comprising:

a signal synchronizer for synchronizing a signal input through a microphone of the system and a test signal;

a loss interval estimator for estimating a loss interval of the signal input from the signal synchronizer;

a signal delay compensator for compensating for a frame signal delayed by a signal loss in a time axis when the signal loss of the loss interval estimated at the loss interval estimator is greater than a threshold; and a loss signal restorer for restoring the loss interval of the signal input from the signal delay compensator.

10. The apparatus of claim 9, wherein the loss interval estimator segments and divides the synchronized signal into frames, calculates a time average of all the frames in the segment, conducts a Fast Fourier Transform (FFT) on the signal divided into the frames and the time average of the frames, and estimates a signal loss interval in every segment and in every frame.

11. The apparatus of claim 10, wherein the signal delay compensator extracts the frame signal delayed by the signal loss from the segmented signal.

12. The apparatus of claim 9, wherein the loss interval is estimated using a least squares method having a criterion based on the following equation:

$$(\hat{a}_i^l, \hat{f}_i^l, \hat{\phi}_i^l) = \underset{a_i^l, f_i^l, \phi_i^l}{\operatorname{argmin}} \sum_{n=0}^{T_i-1} \left| \sum_{l=1}^{N_i} a_i^l \cos\left(2\pi \frac{f_i^l}{f_s} n + \phi_i^l\right) - y_s^i[n, m] \right|^2$$

where $y_s^i[n,m]$ denotes a signal synchronized with a recorded test signal, segmented in sequence, and divided into frames, $a_i^l$ denotes a maximum harmonics order of an i-th segment, $f_s$ denotes a sampling frequency, $f_i^l$ denotes an l-th harmonic frequency, $\phi_i^l$ denotes a phase of the l-th segment, N[n] denotes noise, n denotes a time index, m denotes a frame index, i denotes a segment index, l denotes a number of segments, $T_i$ denotes a frame length, and $N_i$ denotes a total number of harmonics.

13. The apparatus of claim 9, wherein the signal of the loss interval is restored using a least squares method having a criterion based on the following equation:

$$(\hat{a}_i^l, \hat{f}_i^l, \hat{\phi}_i^l) = \underset{a_i^l, f_i^l, \phi_i^l}{\operatorname{argmin}} \sum_{\substack{m=0 \\ m \neq m_{loss}}}^{M-1} \sum_{n=0}^{T_i-1} \left| \sum_{l=1}^{N_i} a_i^l \cos\left(2\pi \frac{f_i^l}{f_s} n + \phi_i^l\right) - y_{s,comp}^i[n, m] \right|^2$$

where $y_{s,comp}^i[n,m]$ denotes a compensated signal, $a_i^l$ denotes a maximum harmonics order of an i-th segment, $f_s$ denotes a sampling frequency, $f_i^l$ denotes an l-th harmonic frequency, $\phi_i^l$ denotes a phase of the l-th segment, N[n] denotes noise, n denotes a time index, m denotes a frame index, i denotes a segment index, l denotes a number of segments, $T_i$ denotes a frame length, and $N_i$ denotes a total number of harmonics.

14. The apparatus of claim 9, wherein a compensation filter is designed using the restored test signal.

15. The apparatus of claim 9, wherein the threshold is determined on an experimental basis.

16. The apparatus of claim 9, wherein the apparatus for restoring the compromised test signal comprises one of a computer, a measurement device, and a portable terminal.

17. The apparatus of claim 9, wherein the signal input through the microphone of the system is output from a speaker of at least one of the system and another device.

* * * * *